United States Patent [19]

Seeman et al.

[11] Patent Number: 5,528,556

[45] Date of Patent: Jun. 18, 1996

[54] COMBINATION WELL LOGGING DEVICE

[75] Inventors: Bronislaw Seeman, Paris; Alain G. M. Delpuech, Le Plessis Robinson; David C. Hoyle, Saint-Cloud, all of France

[73] Assignee: Schlumberger Technology Corporation, New York, N.Y.

[21] Appl. No.: 316,005

[22] Filed: Sep. 30, 1994

[30] Foreign Application Priority Data

Oct. 6, 1993 [FR] France .................... 93 11894

[51] Int. Cl.$^6$ .................................................. G01V 1/40
[52] U.S. Cl. ..................... 367/25; 367/911; 181/102; 250/256; 73/152; 324/339; 324/347
[58] Field of Search ....................... 181/102, 104; 367/25, 86, 911; 324/323, 339, 347; 73/151, 152; 250/264, 256, 269.1, 269.2, 268, 269.3, 269.4

[56] References Cited

U.S. PATENT DOCUMENTS

| 3,500,683 | 3/1970 | Hoyle ........................... 73/152 |
|---|---|---|
| 3,823,319 | 7/1974 | Tittman ......................... 250/265 |
| 4,171,031 | 10/1979 | Marquis ....................... 181/102 |
| 4,302,722 | 11/1981 | Gianzero ...................... 324/339 |
| 4,595,055 | 6/1986 | Vannier ......................... 166/241 |
| 4,614,250 | 9/1986 | Panetta et al. ................. 181/102 |
| 4,958,073 | 9/1990 | Becker et al. ................. 250/269 |
| 5,036,283 | 7/1991 | Trouiller et al. .............. 324/375 |
| 5,198,770 | 3/1993 | Decorps et al. ................ 324/367 |
| 5,282,133 | 1/1994 | Watson .......................... 364/422 |

FOREIGN PATENT DOCUMENTS

| 2079559 | 12/1971 | France . |
|---|---|---|
| 9304229 | 4/1993 | France . |

Primary Examiner—Ian J. Lobo
Attorney, Agent, or Firm—Martin D. Hyden; Leonard W. Pojunas

[57] ABSTRACT

The invention concern a combination well logging device adapted to be moved inside a borehole to measure the properties of geological formations through which the borehole passes.

The device according to the invention comprises a series of elongate logging sections mounted end to end, including a first section adapted to be maintained with a generatrix applied against the wall of the borehole, a second section comprising a body and a measurement pad adapted to be spaced radially from the body for application against said wall, a third section adapted to be kept space from said wall, and first and second hinges connecting the second section to the first and third sections respectively in order to allow respective angles of inclination between the second section and the first and third sections.

18 Claims, 5 Drawing Sheets

COMBINATION WELL LOGGING DEVICE

FIELD OF THE INVENTION

The invention concerns a combination well logging device adapted to be moved inside a borehole to measure the properties of geological formations through which the borehole passes.

DESCRIPTION OF THE PRIOR ART

It is customary to effect logging measurements in oil boreholes, in order to locate hydrocarbon reservoirs in the geological formations through which the borehole passes and to evaluate their potential. In order to do this, several different types of logging are needed, their results being combined. One assembly which is used conventionally is called a "triple combo" in the jargon of oil technicians. It comprises a neutron emission sonde sensitive to the hydrogen content of the formations (for example the CNT tool of Schlumberger) and a gamma-gamma sonde sensitive to the density of the formations (for example the LDT tool of Schlumberger), whose results are combined in order to derive an indication of the porosity of the formations, and a resistivity sonde such as an induction sonde (DIT tool of Schlumberger) or an electrode sonde of Laterolog type (DLT tool of Schlumberger) which allows water saturation Sw to be determined. Furthermore a sonde for measuring natural gamma radiation is added to this assembly (such as the SGT tool of Schlumberger), which is representative of the presence of clays. Finally the tool string includes a telemetry cartridge at its upper end (for example the CTS or DTS cartridge of Schlumberger) providing the interface between the measuring sondes and the electric cable. In the case in which the device comprises a sonde of Laterolog type, it is also customary to include a so-called micro-resistivity sonde (MSFL tool of Schlumberger), which provides better vertical resolution than the abovementioned resistivity sondes and a smaller depth of investigation.

In conventional manner, the above-described range of measurements is obtained in a single lowering operation down the borehole, by means of a tool string formed from various types of sonde attached end to end (for example formed from the tools CNT/SGT/DIT/LDT). The assembly which is thus formed has a length in the order of 20 meters and requires a large number of connections. This requires special care in assembly, and installation at the site of the borehole is made tricky. It also has to be noted that the greater the length of the tool string, the greater the length of the end section of the borehole which cannot be subjected to measurement by the sondes located high in the tool string, because the lower end of the tool string is resting on the bottom of the borehole.

It should also be noted that the requirements on the spacing from (or contact with) the wall of the borehole are very different, depending on the type of sonde. Thus neutron emission sondes should have their active elements, especially the source, in contact with the wall, and for this reason they include a spring located on the side opposite the source. In pad sondes, the pad should rest against the wall. On the contrary, with electrode sondes of spindle type (Laterolog) a space must be left between the sonde and wall. In conventional combination devices, ball joints are inserted between the sondes in order to observe these requirements simultaneously. An example of such a design is given in U.S. Pat. No. 4,595,055 for the example of tools for cased boreholes. However firstly this makes the tool train longer and heavier, and secondly, in the customary case in which the neutron emission sonde is located in the upper part of the tool string, defective contact is sometimes observed between the part containing the source and wall.

It is an object of the present invention to provide a combination well logging device which, for a given combination of measurements, can be more compact than conventional devices.

It is also an object of the invention to provide a combination well logging device composed of sondes having different requirements for their spacing from the wall of the borehole and in which these different requirements are satisfied simultaneously.

Another object of the present invention is to make it possible to provide a combination well logging device which, for a given combination of measurements, can be provided in a more economical way than conventional devices.

SUMMARY OF THE INVENTION

The invention provides a combination well logging device adapted to be moved inside a borehole to measure the properties of geological formations through which the borehole passes, characterized in that the device comprises a series of elongate logging sections mounted end to end, including a first section adapted to be maintained with a generatrix applied against the wall of the borehole, a second section comprising a body and a measurement pad adapted to be spaced radially from the body for application against said wall, and a third section adapted to be kept spaced from said wall, first and second hinges connecting the second section to the first and third sections respectively in order to allow respective angles of inclination between the second section and the first and third sections.

BRIEF DESCRIPTION OF THE DRAWINGS

An embodiment of the invention is described below with reference to the accompanying drawings, in which.

DESCRIPTION OF THE PREFERRED EMBODIMENT

Figure 1:
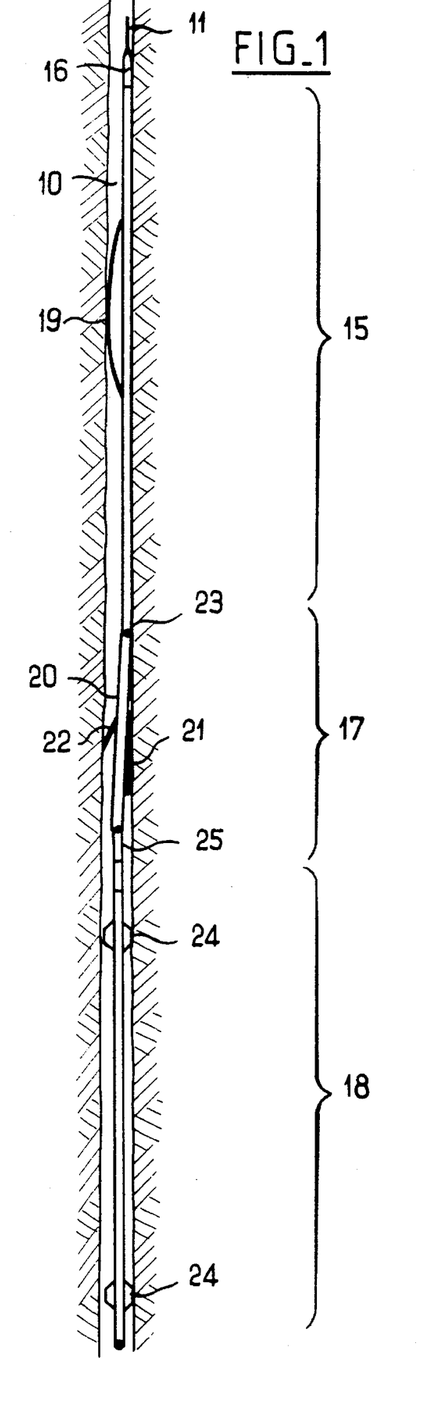
FIG. 1 is a schematic overview of an entire combination logging device constituting an embodiment of the invention, and formed of three sections.

The combination well logging device (or "tool string") shown in FIG. 1 is adapted to be lowered inside a borehole 10 by means of a transmission cable 11. The cable is connected in conventional manner to surface apparatus, not shown, comprising in particular a winch and means for recording and processing the measurement data produced by the logging device and transmitted through the cable.

The device comprises three sections mounted end to end: a first section 15 forming the upper part of the device, connected by a coupling 16 to the cable 11; a second section 17 suspended from the first section 15 and forming an intermediate part; and a third section 18 suspended from the second section and forming the lower part of the device.

The first section is provided with a resilient member 19 in the form of a bow, which bears against the wall of the borehole in its middle part and exerts a force on the first section 15, pressing it against the wall, along a generatrix diametrically opposite the member 19. Such an arrangement is conventional in the case of a neutron logging sonde, which must necessarily be pressed against the wall, in particular in the region of the neutron source, in order to provide correct measurements.

In addition to a neutron logging sonde such as a CNT tool of Schlumberger, the first section may suitably include a sonde for measuring natural gamma radioactivity and a telemetry cartridge forming the interface between the elements of the device and the cable. An inclinometer sonde, such as the GPIT tool of Schlumberger, which comprises accelerometers and magnetometers for all three axes may also be suitably included in this section.

The second section 17 comprises a body forming a cradle 20 carrying a measuring pad 21 adapted to be pressed against the wall, and a counter-arm 22 on the side opposite the pad 21. The measuring pad typically comprises a gamma-gamma device providing a measure of formation density. It can also, as described above, comprise a "microresistivity" device providing a measurement of the resistivity in the rear zone of the wall of the borehole, called the invaded zone.

The second section is connected to the first section 15 by a hinge 23 which allows the second section 17 to be inclined relative to the first section 15. More particularly, in the embodiment shown in FIG. 1 and more clearly in FIG. 2, the second section can pivot relative to the first section about an axis perpendicular to the axis of the first section, in a longitudinal plane containing the abovementioned contact generatrix. This pivoting is allowed solely away from said generatrix. It should also be stressed that the hinge 23 does not allow any twisting between the second section and the first section. The angular orientation of the body 20 is preferably such that the median longitudinal plane of the pad 21 is aligned with the abovementioned contact generatrix, as shown in FIG. 1.

It is to be noted that the electronics cartridge containing the processing circuits associated with the sensors in the pad 21 can be located in the first section 15, rather than being attached to the body 20 in the second section 17. Such a design has the advantage of reducing the length and the weight of the second section.

The third section 18 comprises one or more spacers 24 (called stand-offs) which keep it spaced from the wall of the borehole. The third section comprises a sonde for measuring resistivity, which can be an electrode sonde of Laterolog type (DLT or ARI tool of Schlumberger), or a sonde with induction coils (DIT or AIT tool of Schlumberger).

The third section is connected to the second section 17 by a hinge 25 allowing these sections to be inclined relative to each other. In the described embodiment, this is a hinge of the same type as the hinge 23, which provides one degree of freedom between the second and third sections. The hinge 25 is so located that it allows pivoting in the same plane as the longitudinal plane defined above for the hinge 23. However, as shown in FIG. 1, the pivoting is allowed only towards the abovementioned generatrix—that is to say towards the pad 21—even though the pivoting is allowed away from the said generatrix in the case of the hinge 23. Moreover, as in the case of the coupling between the first and second sections, the third section cannot twist relative to the second section.

Figure 2:
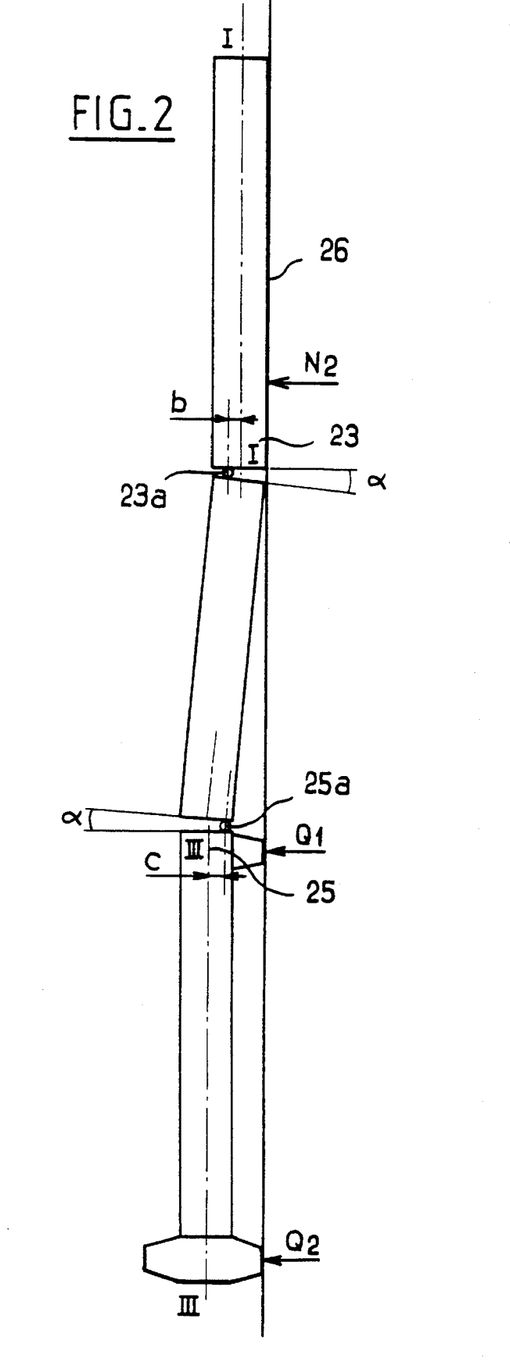
FIG. 2 shows the geometry of the second section of the device of FIG. 1, and more particularly its joints with the other sections.

FIG. 2 shows the hinges 23 and 25, symbolized by respective pivots 23a and 25a, with the pivotal angles exaggerated compared with reality.

It is noted that the hinge 23 between the first and second sections has an axis that is offset from the axis I—I of the first section by a distance b, the said axis being located on the side opposite to the contact generatrix 26 of the first section. The maximum pivotal angle allowed by the hinge 23 is an angle $\alpha$. A suitable value for this angle is around 2°.

The hinge 25 has its axis offset relative to the axis III—III of the third section by a distance c, the said axis being located on the same side as the contact generatrix 26 and accordingly on the side opposite to the pivotal axis of the hinge 23. As in this latter case, the desired maximum pivotal angle is around 2°.

The distances b and c are chosen to minimize the risk of loss of contact between the first section and wall of the borehole under the action of the weight of the assembly formed by the second and third sections. For this purpose it is arranged that the center of gravity of the assembly formed by the second and third sections to be no further from the wall than the pivot 23a, or to be closer. Thus, in the embodiment shown, the distance b is selected to be of the same order as the distance c. Typical values are for example a distance b of 22 mm and a distance c of 22 mm.

Figure 3A:
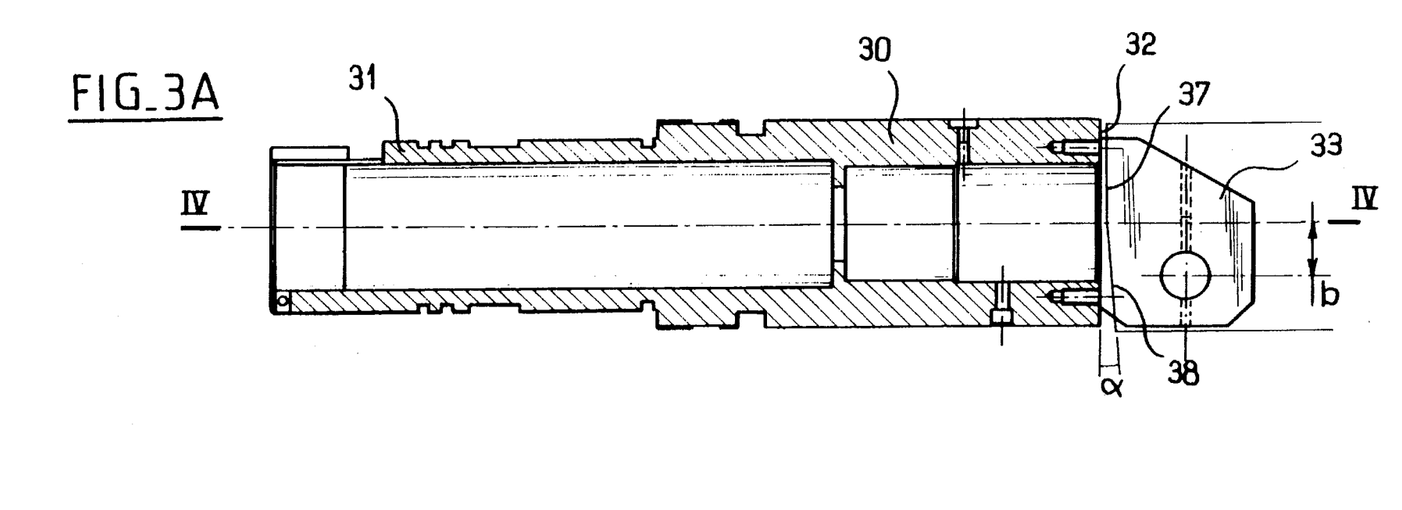
FIGS. 3A and 3B are detail views of one embodiment of the above-mentioned joints.
Figure 3B:
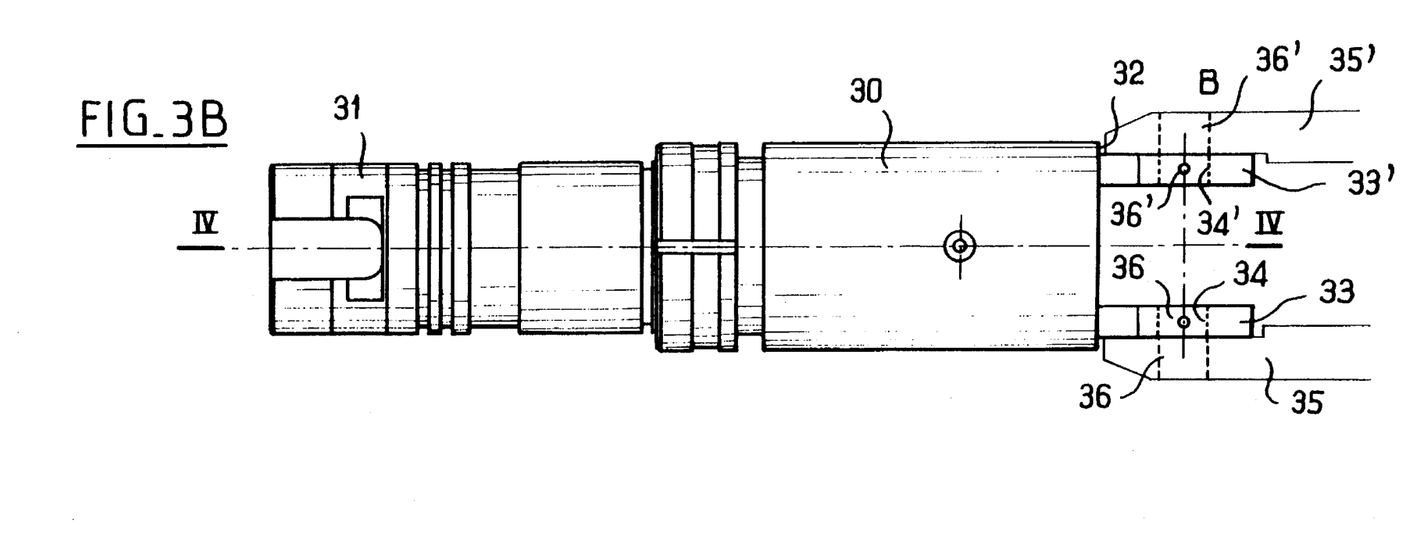

FIGS. 3A and 3B show one possible implementation of the hinges 23, 25. If the case of the hinge 23 is considered, this comprises a tubular part 30 with an axis IV—IV, comprising an end part 31 adapted to be fixed to the adjacent section, in this case the first section 15. The part 30 has an annular transverse face 32 at the end opposite the part 31 and two parallel, longitudinal clevis plates 33, 33' extending from the face 32. These plates have respective holes 34, 34' with the same transverse axis B, which axis is spaced from the axis IV—IV by a distance b in accordance with the preceding remarks. The part of the hinge which is connected to the second section 17 comprises two clevis plates 35, 35' associated with the plates 33, 33' respectively and provided with respective pivots 36, 36' engaged in the holes 34, 34'. The plates 35, 35' are shown in FIG. 3B as being located outside the plates 33, 33', but they could equally be located between the plates 33, 33'. Each of the plates 35, 35' has an end surface with two facets which cooperate with the end face 32 of the tubular part 30 in order to allow the limited pivoting, and that solely in one sense, of the second section 17 relative to the first section 15. This surface thus comprises a transverse facet 37 which is accordingly parallel to the end face 32, and an oblique facet 38 meeting the transverse facet at an edge which intersects the axis IV—IV. The oblique facet 38 is located on the side of the pivots 36, as FIG. 3A shows. The angle between the oblique facet and the transverse facet corresponds to the pivotal angle α mentioned above. Moreover, although the transverse facet 37 has been shown for the sake of clarity spaced from the face 32, it should be noted that the transverse facet abuts the face 32, thus preventing any pivoting of the plates 35, 35' in counterclockwise sense (in FIG. 3A). The plates 35, 35' can only pivot clockwise until the oblique facet 38 comes into abutment with the end face 32.

One implementation of the coupling mechanism of the second section 17 including a measuring pad 21 is now described with reference to the schematic views of FIGS. 4A and 4B.

The face of the pad 21 for contacting the wall of the borehole is referenced 40. The pad 21 is supported by an arm 41, one end of which is connected to the rear face 42 of the pad by a hinge 43, which allows pivoting between the pad and the arm 41. The arm 41 is extended at its end remote from the hinge 43 by a bent part or crank 44, whose end is connected to the body 20 by a fixed pivot 45. The counter-arm 22, whose outer end 46 is adapted to contact the wall of the borehole on the side opposite the pad 21, is similarly extended by a bent part or crank 47, whose end is connected by a pivot 48 to the end of a connecting rod 48' pivoted to the end of the rod 49 of a piston 50. This piston is mounted in a cylinder 51 fixed to the body 20 and can be displaced by application of hydraulic pressure overcoming the action of a spring 52, which acts on the pivot 48 in the sense opening out the counter-arm 22. The arm 41 and the counter-arm 22 are connected by a floating pivot 53 located at their junctions with the crank 44 and the crank 47 respectively but not connected to the body 20. This arrangement has the effect that, when the counter-arm 22 comes into contact with the wall of the borehole under the action of the spring 52, as in the position of FIG. 4B, the arm 41 pivots until the pad 21 contacts the wall of the borehole. The piston 50 is actuated to restore the mechanism to the closed position shown in FIG. 4A.

Figures 4A, 4B:
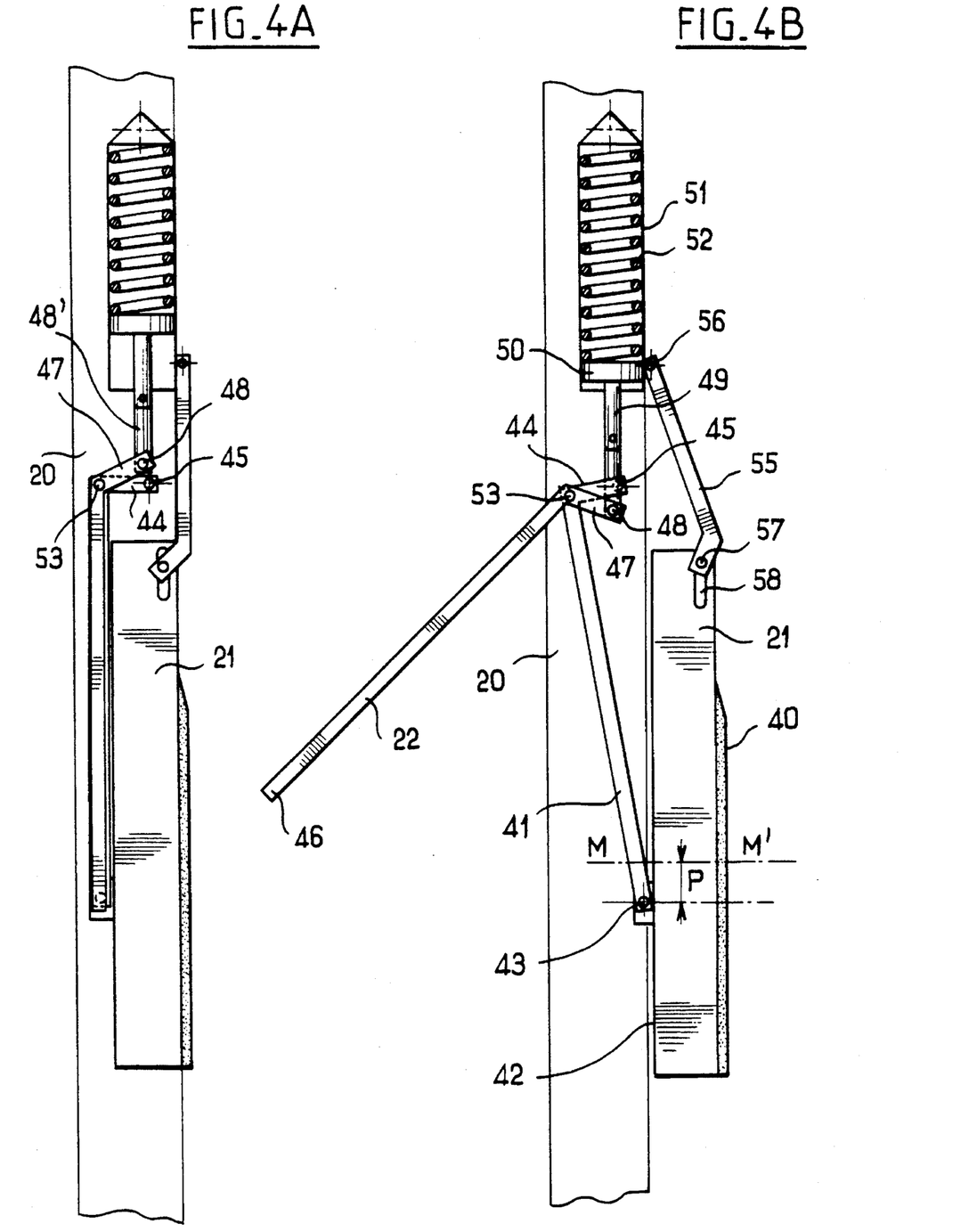
FIGS. 4A and 4B are schematic diagrams showing one embodiment of the coupling mechanism for the second section carrying a pad, respectively in the closed position and in the open position.

The embodiment shown in FIGS. 4A and 4B also comprises an upper link 55 having its upper end connected to the body 20 by a pivot 56 and having a pivot pin 57 at its lower end engaging in a slot 58 formed in the upper part of the pad 21. The link 55 acts to limit the inclination which the pad 21 can assume relative to the axis of the body 20 but, with the play of the pivot pin 57 along the slot 58, does not exert any significant pull on the pad 21 during the displacement of the body. A similar arrangement, comprising a lower link, can be provided in a symmetrical manner at the lower part of the pad.

It is to be noted that, in this implementation, the pad 21 is supported by the single arm 41 and, as a result, the whole of the force exerted on the pad 21 to move it along the wall of the borehole is transmitted by the pivot 43. This results in particular in the force being applied without giving rise to a couple tending to tilt the pad. As shown in FIGS. 4A and 4B, the pivot 43 is preferably located in the central part of the pad 21 (considered in the longitudinal direction), near to the central plane M-M' of the pad transverse to the axis of the body. The location considered the most advantageous for the pivot 43 is in the lower half of the pad, slightly below the central plane M-M', as is shown in FIGS. 4A and 4B. More specifically, the distance p between the pivot 43 and the central plane M-M' preferably lies between 0% and 15% of the length of the part 40 of the pad which is adapted to make contact with the wall. With such a design, the reaction force of the wall of the borehole on the pad acts in the central zone of the pad, as is desirable for optimum application of the pad against the wall.

Figures 5A, 5B:
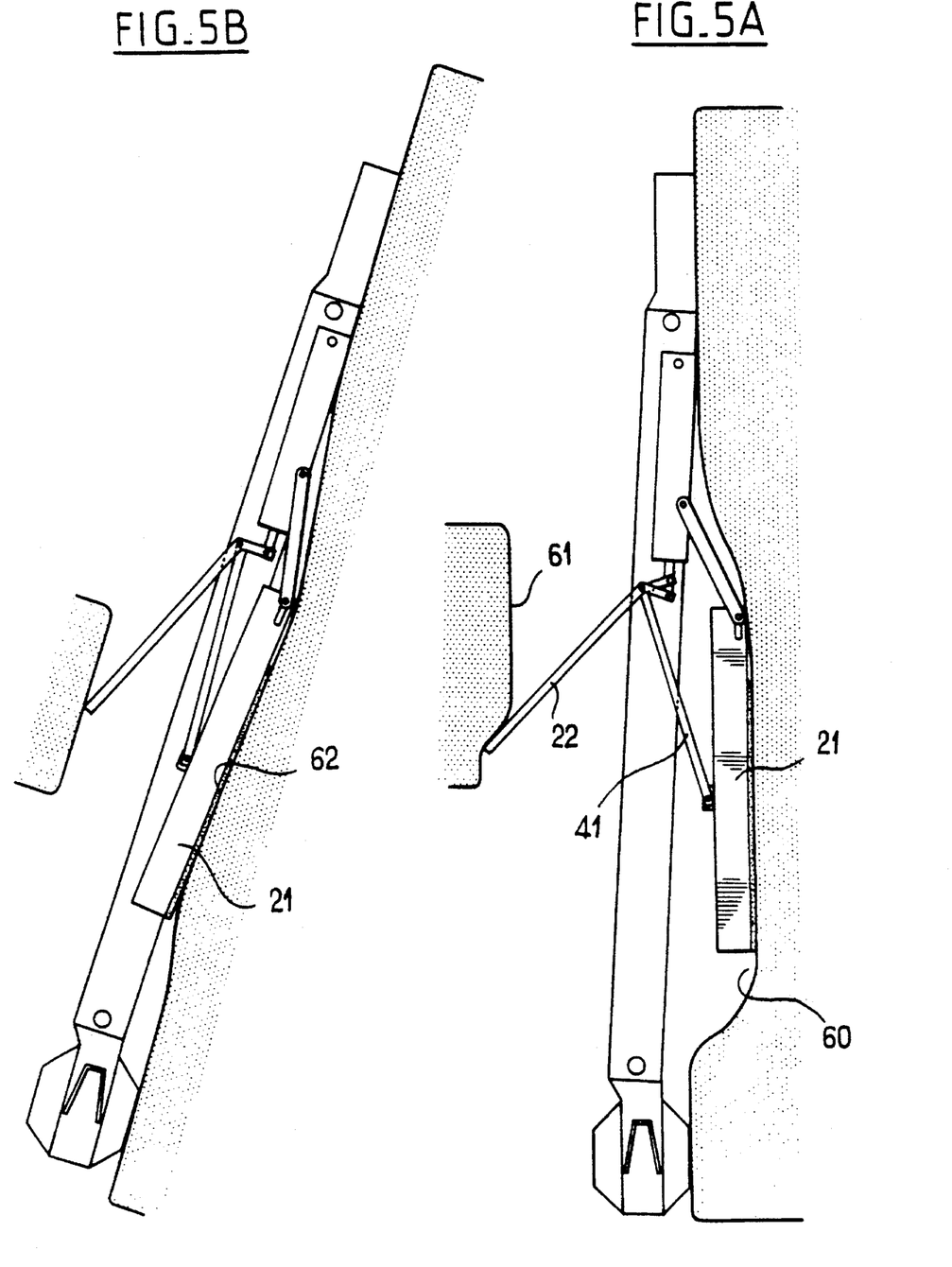
FIGS. 5A and 5B illustrate the behavior of the coupling mechanism of FIGS. 4A and 4B under different operating conditions.

The described implementation ensures satisfactory contact of the pad 21 with the wall of the borehole under diverse working conditions illustrated in FIGS. 5A and 5B.

FIG. 5A illustrates the simultaneous presence of a "hollow" 60, consisting of a cavity formed in the wall of the borehole beside the pad 21, and of a projection or cornice 61 on the opposite side of the wall. FIG. 5A shows that the coupling mechanism described above is able to absorb such abrupt variations in the diameter of the borehole: the respective angular divergences of the counter-arm 22 and of the arm 41 relative to the axis of the body can vary significantly without affecting the force applied to the pad 21 by the arm 41 and, on the other hand, the arrangement of arms connected to the pad 21, namely the arm 41 and the link 55 in the illustrated embodiment, allows the pad 21 to rest against the wall, despite the presence of a hollow, in an optimum manner given the longitudinal dimension of the pad.

FIG. 5B shows an inclined borehole with a ramp 62. The pad 21 is capable of remaining in contact with the wall along this ramp because of the inclination which it can assume relative to the body of the sonde. Equally, the mounting of the body 20 between two hinges, as described above, is a favorable factor which avoids the pad becoming "caked" against the wall by the body 20.

It should be noted that the pivotal connection between the arm 41 and the pad 21 can be implemented in a different way from that described above. Thus a connection could be provided between two lateral pivots located on one side and the other of the pad 21, engaging in a fork extending the arm 41.

Figures 6, 8A, 8B:
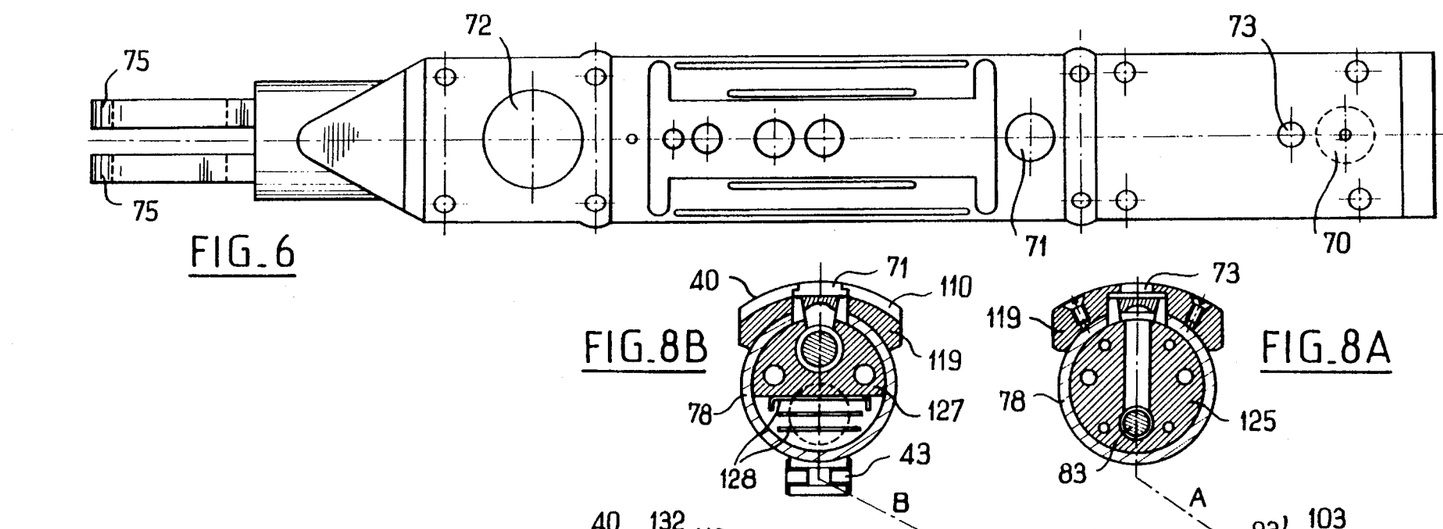
FIG. 6 is view of the contact face of the measuring pad, in an embodiment that includes two types of sensor that are interleaved.
FIGS. 8A and 8B are sections of the pad of FIG. 7 on the lines A—A and B—B respectively.

A preferred embodiment of the pad 41 will now be described with reference to FIGS. 6, 7 and 8A–8B. As indicated above, it is arranged to combine in a single pad both gamma-gamma transducers or sensors providing a measure of the density of the formations and transducers of different type providing a measure with high vertical resolution of another magnitude, preferably resistivity, in the zone adjoining the wall of the borehole. This combination is realized as shown in FIG. 6 by interleaving members of different types: the gamma-gamma sensors comprise a source of gamma rays and at least one near detector and one far detector, represented in FIG. 6 by the windows 70, 71 and 72 associated with these components respectively; the electrodes A0, A1, M, etc., which make up the device for measuring resistivity are interleaved in the space between the window of the near detector 71 and that of the far detector 72. This design minimizes the length of the contact part 40 of the pad, which is advantageous for good application of the pad against the wall and is equally favorable from the point of view of combining the density measurements with the micro-resistivity measurements respectively provided by these sensors, since errors in the depths attributed to the measurements arising in particular from variations in the instantaneous speed of the pad, are avoided in large measure.

In the embodiment shown in the figures, the gamma-gamma device comprises, apart from the near and far detectors, a backscatter detector located in the immediate vicinity of the source, in accordance with the teaching of U.S. Pat. No. 4,958,073. This detector is characterized by a non-negative response to an increase in the density of the formation, in contrast with the near and far detectors which are attenuation detectors and exhibit a negative response to an increase in the density. The window associated with the backscatter detector is shown at 73 in FIG. 6.

As to the design of the electrodes of the micro-resistivity sensor, this is generally in conformity with the teaching of U.S. Pat. No. 5,036,283, especially FIG. 5 of this patent, or of U.S. Pat. No. 5,198,770 and reference is made to these documents for more information. The design of the electrodes shown comprises firstly a generally I-shaped guard electrode A0 providing passive focusing, and an active focusing system comprising focusing electrodes A1 located on either side of the electrode A0 relative to the longitudinal direction of the pad, and control electrodes M located between the guard electrode A0 and the focusing electrodes A1. The illustrated design also comprises a measuring electrode in the form of a button B0 fitted within the central electrode A0, being insulated therefrom, being centered in its median plane, and being sensitive to the resistivity Rxo of the invaded zone, together with two buttons B1, B2 aligned with the button B0 and of smaller diameter, which provide a measure of resistivity with a smaller depth of investigation, of the type known as Microlog. In addition a button B3 identical with the button B0 is provided in alignment therewith in the longitudinal direction. The buttons B0 and B3, being aligned in the longitudinal direction (i.e. in the direction of movement of the pad) provide two measurements from the same zone of the formation at offset instants, which makes it possible to determine the speed of movement of the pad by correlation. The resulting information is used to determine a depth correction. It is advantageously combined with an indication of the speed obtained from acceleration measurements provided by the above-mentioned inclinometer sonde of the first section, in order to improve the accuracy of the correction, in accordance with a method described in detail in French patent application 93 04229 filed 9th Apr. 1993.

Referring more particularly to FIGS. 8A, 8B, note firstly the face 40 adapted to contact the wall of the borehole and having to this end the shape of a sector of a cylinder. On the opposite side is seen the pivot 43 for making the connection to the support arm, such as the arm 41 shown in FIG. 4B. At its upper end, the pad is extended by two clevis plates 75, each with a slot referenced 58 as in FIG. 4B, for the connection with a link such as the link 55 shown in FIG. 4B.

As its main structural part, the pad comprises a pressure-resistant casing 78 of generally cylindrical shape, made of stainless steel for example. Inside the casing 78 are disposed gamma ray detectors 81, 82, 83, the detectors 81 and 82 "near" and "far" attenuation detectors respectively and the detector 83 being a backscatter detector. In order to allow the gamma rays to reach the detectors, the casing 78 has openings provided with collars 91, 92, 93 on which rest respective domed parts 91', 92', 93' made of a pressure-resistant material with low gamma ray absorption, such as beryllium or titanium. Protective parts 101, 102, 103 of synthetic material of the PEEK type for example are fixed on the domes 91', 92', 93' respectively, these parts forming the windows 71, 72, 73 shown in FIG. 6.

The detectors are appropriately photo-scintillators of GS0 type (gadolinium orthosilicate) or NaI. Assemblies 111, 112, 113 respectively are associated with the detectors 81, 82, 83, each being composed of a photo-multiplier, a high voltage supply with its control circuit and a preamplifier circuit. The gamma ray source, typically a cesium 137 source is a unit 80 located at the lower end of the pad on the outside of the casing 78 and which has its own pressure-resistant envelope 100.

The electrodes A0, M, A1 which form the micro-resistivity sensor are metal parts located in respective recesses formed in a sector of a collar 110 of insulating material, for example PEEK. The detectors 81–83 are screened from unwanted gamma rays (i.e. those which have not interacted with the formation), in particular from direct arrivals, by shields with high gamma ray absorbing power, for example made of material such as tungsten or depleted uranium.

Thus, one shield member 119 with the shape of a sector of a collar is shown in FIGS. 8A, 8B covering the casing 78 in the lower part of the pad, the member 119 having openings which form the windows 70 (for the source), 71 (near detector) and 73 (backscatter detector). This member has an end part 120 which beyond the source 80, thus forming the lower end of the pad, in such a way as to minimize the gamma ray flux towards the borehole fluid. At the opposite end the member 119 is continued by a part 121 extending well beyond the window 71 of the near detector 81, the part 121 being located between the casing 78 and the inside of the sector 110 of insulating material. This arrangement of the shield member minimizes the risk of gamma rays escaping through the insulating material, which has a low absorption to gamma rays. In like manner, a shield member 122 is located on the outside of the casing 78 in the region of the far detector 82 and has an opening forming the window 72.

Figure 7:
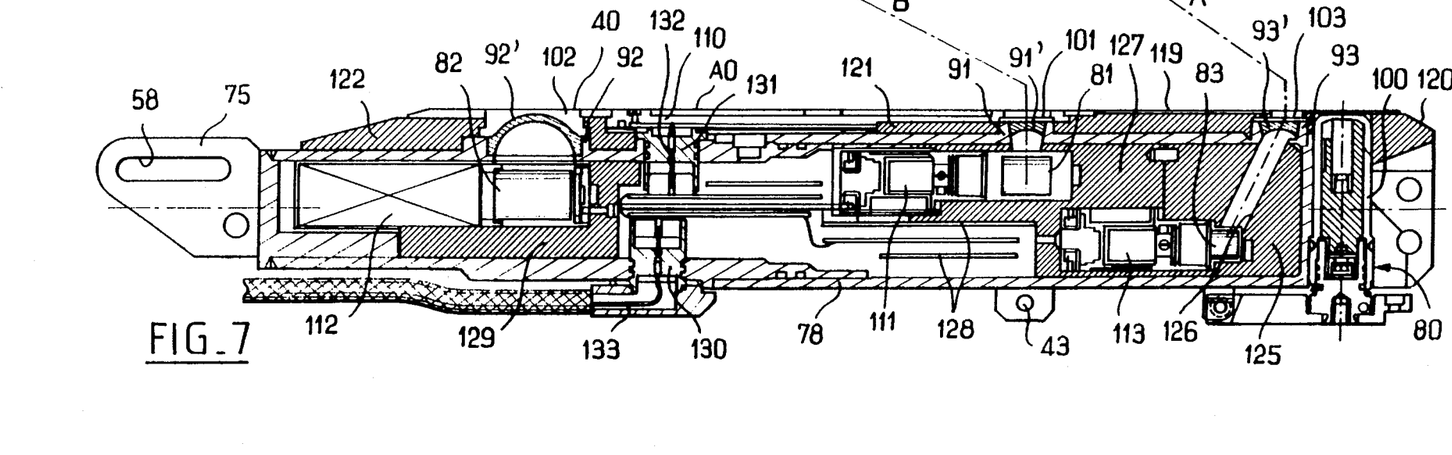
FIG. 7 shows the pad of FIG. 6 in section on the longitudinal plane VII—VII of FIG. 6.

Shield members of generally cylindrical shape are also provided on the inside of the casing 78. A first inner member 125 surrounds the backscatter detector 83. The member 125 has an oblique hole 126 which ensures collimation of the gamma rays towards the detector 83. A second inner member 127 is fixed to the member 125 and surrounds the near detector 81. The member 127 has the shape of a half-cylinder, as FIG. 7 shows, in its upper part, leaving the lower part of the space inside the casing 78 free, which can thus receive circuit boards or electronics components 128. In like manner, an inner shield member 129 surrounds the far detector 82.

It is also noted that the casing 78 has openings receiving sealed feed-throughs 130, 131 to provide passage for conductors, such as conductors 132 which connect the electrodes (A0, etc.) to circuit boards or components located inside the casing 78 and conductors 133 which connect the boards or associated components to the gamma detectors or to the electrodes on the body of the sonde.

We claim:

1. A combination well logging device adapted to be moved inside a borehole to measure the properties of geological formations through which the borehole passes, characterized in that the device comprises a series of elongate logging sections mounted end to end, including a first section adapted to be maintained with a generatrix applied against the wall of the borehole, a second section comprising a body and a measurement pad adapted to be spaced radially from the body for application against said wall, a third section adapted to be kept spaced from said wall, and first and second hinges connecting the second section to the first and third sections respectively in order to allow respective angles of inclination between the second section and the first and third sections.

2. A device according to claim 1, wherein the angle of inclination between the first and the second sections is restrained to be within a longitudinal plane containing said generatrix.

3. A device according to claim 2, wherein the pad of the second section is restrained to stay in line with said generatrix.

4. A device according to claim 2, wherein the angle of inclination between the second and the third sections is restrained to be within said longitudinal plane containing said generatrix.

5. A device according to claim 1, wherein the first hinge is so designed that the second section can incline relative to the first section solely to the side away from the pad.

6. A device according to claim 5, wherein the second hinge is so designed that the third section can incline relative to the second section solely to the side towards the pad.

7. A device according to claim 1, wherein each of the hinges allows an angular movement of around 2°.

8. A device according to claim 1, wherein the hinges comprise respective pivots whose angular positions relative to the axis of the second section are diametrically opposed.

9. A device according to claim 8, wherein the pivot of the second hinge is further from the axis of the second section than the pivot of the first hinge.

10. A device according to claim 1, wherein the first section comprises a sonde adapted to provide measurements relating to the porosity of the geological formations.

11. A device according to claim 10, wherein the first section comprises a neutron emission sonde.

12. A device according to claim 1, wherein the third section comprises a sonde adapted to provide measurements related to the saturation with hydrocarbons of the geological formations.

13. A device according to claim 10, wherein the third section comprises a sonde adapted to provide measurements related to the resistivity Rt of the "non-invaded" zone of the geological formations.

14. A device according to claim 13, wherein the third section comprises an electrode sonde of Laterolog type.

15. A device according to claim 14, wherein said electrode sonde is designed to provide a plurality of measurements for azimuths regularly distributed round the longitudinal axis of the section.

16. A device according to claim 13, wherein the third section comprises an induction sonde.

17. A device according to claim 1, wherein the second section is designed to provide measurements related to the density of the geological formations.

18. A device according to any one of claim 1, wherein the second section is designed to provide measurements related to the resistivity Rxo of the geological formations in the zone adjacent to the wall of the borehole.

* * * * *